(12) United States Patent
Silva et al.

(10) Patent No.: US 11,471,952 B2
(45) Date of Patent: Oct. 18, 2022

(54) CUTTING TOOL HAVING REPLACEABLE CUTTING HEAD AND METHOD OF SECURING A REPLACEABLE CUTTING HEAD

(71) Applicant: Kennametal Inc., Latrobe, PA (US)

(72) Inventors: Marcelo Euripedes Silva, Piracicaba (BR); Ruy Frota de Souza Filho, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 233 days.

(21) Appl. No.: 16/824,537

(22) Filed: Mar. 19, 2020

(65) Prior Publication Data

US 2021/0291280 A1 Sep. 23, 2021

(51) Int. Cl.
  *B23B 51/02* (2006.01)
  *B23B 27/16* (2006.01)
  *B23B 51/12* (2006.01)

(52) U.S. Cl.
  CPC .............. *B23B 27/16* (2013.01); *B23B 51/12* (2013.01); *B23B 2251/02* (2013.01)

(58) Field of Classification Search
  CPC ............ B23B 2251/02; B23B 2240/24; B23B 2240/32; B23B 27/16; B23C 2210/02; B23C 2240/32; B23C 2240/24
  See application file for complete search history.

(56) References Cited

U.S. PATENT DOCUMENTS

| 124,089 A | 2/1872 | Shepardson |
| 318,994 A | 6/1885 | Lake |
| 1,461,023 A | 7/1923 | Paul |

(Continued)

FOREIGN PATENT DOCUMENTS

| CN | 101801576 A | 9/2012 |
| CN | 103692001 A | 4/2014 |

(Continued)

OTHER PUBLICATIONS

External_ Our Reference_ K 2986 DE_ Kennametal Inc_ German Patent Application 11 2017 006 304_3.msg.

(Continued)

*Primary Examiner* — Boyer D Ashley
*Assistant Examiner* — Stephen Sun Cha
(74) *Attorney, Agent, or Firm* — Larry R. Meenan (57) ABSTRACT

A rotary cutting tool includes a tool shank, a replaceable cutting head mounted on the tool shank, a coupling pin, and an actuation member. In one embodiment, the coupling pin has a cylindrical portion with a reduced-diameter portion defined by a pair of angled side walls separated by a bottom surface for cooperating with a non-threaded portion at one end of the actuation member. In another embodiment, the coupling pin has a cylindrical portion with a notch with a pair of side walls for cooperating with a frustoconical member at one end of the actuation member. When assembled, a pair of V-shaped contact surfaces on the cutting head engage a pair of oppositely facing V-shaped contact surfaces on the tool shank to provide stability against the momentum created by cutting forces in two different directions and securely hold the cutting head in place during machining operations.

14 Claims, 8 Drawing Sheets

(56) References Cited

U.S. PATENT DOCUMENTS

| | | |
|---|---|---|
| 1,461,548 A | 7/1923 | West |
| 1,946,158 A | 2/1934 | Heinrich |
| 2,167,014 A | 7/1939 | Verderber |
| 2,399,939 A | 5/1946 | Phillips |
| 2,400,856 A | 5/1946 | Thompson |
| 2,485,799 A | 10/1949 | Woytych |
| 2,801,614 A | 8/1957 | Dieterich et al. |
| 2,847,225 A | 8/1958 | Kosinski |
| 3,049,033 A | 8/1962 | Benjamin |
| 3,311,023 A | 3/1967 | Kaiser |
| 3,436,990 A | 4/1969 | Tourison |
| 4,611,672 A | 9/1986 | Holzl |
| 4,632,593 A | 12/1986 | Stashko |
| 4,726,268 A | 2/1988 | Erickson |
| 4,744,704 A | 5/1988 | Galvefors |
| 4,813,829 A | 3/1989 | Koppelmann |
| 4,854,789 A | 8/1989 | Evseanko, Jr. |
| 4,913,607 A | 4/1990 | von Haas |
| 5,407,308 A | 4/1995 | Takayoshi |
| 5,452,971 A | 9/1995 | Nevills |
| 5,599,145 A | 2/1997 | Reinauer et al. |
| 5,622,460 A | 4/1997 | Satran et al. |
| 5,678,645 A | 10/1997 | Tibbitts et al. |
| 5,704,742 A | 1/1998 | Reinauer |
| 5,820,318 A | 10/1998 | Danielsson et al. |
| 5,904,448 A | 5/1999 | Lee |
| 5,904,455 A | 5/1999 | Krenzer et al. |
| 5,947,660 A * | 9/1999 | Karlsson ............... B23B 51/02 408/230 |
| 5,957,631 A | 9/1999 | Hecht |
| 5,957,635 A | 9/1999 | Nuzzi et al. |
| 5,961,259 A | 10/1999 | Ziegler |
| 5,971,673 A | 10/1999 | Berglund |
| 6,012,881 A | 1/2000 | Scheer |
| 6,109,152 A | 8/2000 | Hecht |
| 6,109,841 A | 8/2000 | Johne |
| 6,196,769 B1 | 3/2001 | Satran et al. |
| 6,276,879 B1 | 8/2001 | Hecht |
| 6,447,222 B2 | 9/2002 | Kojima |
| 6,485,235 B1 | 11/2002 | Mast et al. |
| 6,506,003 B1 | 1/2003 | Erickson |
| 6,514,019 B1 | 2/2003 | Schulz |
| 6,530,728 B2 | 3/2003 | Eriksson |
| 6,582,164 B1 | 6/2003 | McCormick |
| 6,783,307 B2 | 8/2004 | Lindblom |
| 6,783,308 B2 | 8/2004 | Lindblom |
| 7,070,367 B2 | 7/2006 | Krenzer |
| 7,131,799 B2 | 11/2006 | Stokey et al. |
| 7,309,196 B2 | 12/2007 | Filho |
| 7,311,480 B2 | 12/2007 | Heule et al. |
| 7,360,974 B2 | 4/2008 | Borschert et al. |
| 7,377,730 B2 | 5/2008 | Hecht et al. |
| 7,407,350 B2 | 8/2008 | Hecht et al. |
| 7,467,915 B2 | 12/2008 | Filho |
| 7,478,983 B2 | 1/2009 | Guy |
| 7,625,161 B1 | 12/2009 | Filho |
| 7,972,094 B2 | 7/2011 | Men et al. |
| 7,997,836 B2 | 8/2011 | Kim et al. |
| 8,312,615 B2 | 11/2012 | Frota de Souza Filho |
| 8,449,227 B2 | 5/2013 | Danielsson |
| 8,550,756 B2 | 10/2013 | Borschert et al. |
| 8,678,722 B2 | 3/2014 | Aare |
| 8,702,356 B2 | 4/2014 | Hecht et al. |
| 8,721,235 B2 | 5/2014 | Kretzschmann et al. |
| 8,784,018 B2 | 7/2014 | Päbel |
| 8,840,347 B2 | 9/2014 | Aare |
| 8,876,444 B1 | 11/2014 | Chanturidze |
| 8,876,446 B2 | 11/2014 | Shaheen |
| 8,882,413 B2 | 11/2014 | Hecht |
| 8,992,143 B2 | 3/2015 | Glimpel et al. |
| 9,073,129 B2 | 7/2015 | Craig et al. |
| 9,108,251 B2 | 8/2015 | Craig |
| 9,162,295 B2 | 10/2015 | Päbel et al. |
| 9,205,498 B2 | 12/2015 | Jaeger |
| 9,468,979 B2 | 10/2016 | Hecht |
| 9,545,699 B2 | 1/2017 | Furusawa et al. |
| 9,555,484 B2 | 1/2017 | Koga |
| 9,770,766 B2 | 9/2017 | Singer-Schnoeller |
| 9,895,754 B2 | 2/2018 | Mani |
| 10,207,337 B2 | 2/2019 | Filho |
| 10,213,845 B2 | 2/2019 | Schwaegerl et al. |
| 10,471,522 B2 | 11/2019 | Yamamoto et al. |
| 2001/0026738 A1 | 10/2001 | Kojima |
| 2002/0015623 A1 | 2/2002 | Eriksson |
| 2002/0168239 A1 | 11/2002 | Mast et al. |
| 2003/0091402 A1 | 5/2003 | Lindblom |
| 2003/0091403 A1 | 5/2003 | Lindblom |
| 2003/0219321 A1 | 11/2003 | Borschert et al. |
| 2005/0098359 A1 | 5/2005 | Lee |
| 2006/0051172 A1 | 3/2006 | Johnson et al. |
| 2007/0274794 A1 | 11/2007 | Cirino |
| 2008/0003072 A1 | 1/2008 | Kim et al. |
| 2008/0101878 A1 | 5/2008 | Skilberg |
| 2010/0021253 A1 | 1/2010 | Frejd |
| 2010/0104384 A1 | 4/2010 | Orlov et al. |
| 2010/0303561 A1 | 12/2010 | Fouquer |
| 2010/0322723 A1 | 12/2010 | Danielsson |
| 2010/0322731 A1 | 12/2010 | Aare |
| 2011/0008114 A1 | 1/2011 | Wang |
| 2011/0110735 A1 | 5/2011 | Klettenheimer et al. |
| 2011/0110739 A1 | 5/2011 | Frisendahl |
| 2011/0114393 A1 | 5/2011 | Dolan et al. |
| 2011/0236145 A1 | 9/2011 | PÄbel et al. |
| 2012/0014760 A1 | 1/2012 | Glimpel et al. |
| 2012/0014860 A1 | 1/2012 | Harris et al. |
| 2012/0148358 A1 | 6/2012 | Hecht et al. |
| 2012/0230787 A1 | 9/2012 | Harif |
| 2013/0042462 A1 | 2/2013 | Filho |
| 2013/0259590 A1 | 10/2013 | Shaheen |
| 2014/0154023 A1 | 6/2014 | Craig |
| 2014/0255117 A1 | 9/2014 | Tseng |
| 2014/0353931 A1 | 12/2014 | Filho et al. |
| 2014/0360334 A1 | 12/2014 | Singer-Schnoeller |
| 2014/0363257 A1 | 12/2014 | Parker |
| 2015/0147128 A1 | 5/2015 | Saji |
| 2015/0306686 A1 | 10/2015 | Mani |
| 2015/0328693 A1 | 11/2015 | Koga |
| 2015/0360300 A1 | 12/2015 | Hecht |
| 2016/0067785 A1 | 3/2016 | Wang et al. |
| 2016/0263664 A1 | 9/2016 | Son et al. |
| 2017/0028479 A1 | 2/2017 | Haimer |
| 2018/0065191 A1 | 3/2018 | Hecht |
| 2018/0169771 A1 | 6/2018 | Filho et al. |
| 2019/0126361 A1 | 5/2019 | Hecht et al. |

FOREIGN PATENT DOCUMENTS

| | | | |
|---|---|---|---|
| CN | 102413974 A | 6/2014 | |
| CN | 205020901 U | 2/2016 | |
| CN | 103249511 A | 8/2016 | |
| CN | 109365844 A | 12/2020 | |
| DE | 803143 C | 3/1951 | |
| DE | 7043832 U | 3/1971 | |
| DE | 3912503 A1 * | 3/1990 | ............ B23B 31/00 |
| DE | 19710996 | 12/1999 | |
| DE | 19834635 C2 | 7/2001 | |
| DE | 202011050277 | 7/2012 | |
| EP | 0343653 B1 | 7/1991 | |
| EP | 1864733 A1 | 12/2007 | |
| GB | 1341651 A | 12/1975 | |
| JP | 2000084718 A | 3/2000 | |
| JP | 2004261931 A | 9/2004 | |
| JP | 2004276134 | 10/2004 | |
| JP | 2004306170 A | 11/2004 | |
| JP | 2004330390 A | 11/2004 | |
| JP | 2004330391 A | 11/2004 | |
| JP | 2006272472 A | 10/2006 | |
| JP | 2016193461 | 11/2016 | |
| JP | 2016055353 A | 10/2018 | |
| SE | 516366 | 4/2001 | |
| WO | WO2006001551 | 1/2006 | |
| WO | WO2009050789 A1 | 4/2009 | |

(56) References Cited

FOREIGN PATENT DOCUMENTS

| WO | WO2011058532 | 5/2011 |
| WO | WO2017207793 A1 | 12/2017 |

OTHER PUBLICATIONS

External_ Re_ Chinese Patent Application No. 201780076453_4; Our Ref_ P19J42412A .msg.
External_ Chinese patent application No. 201810251132_X_ Our ref_P17J31437. msg.
External_ Chinese Patent Application No. 201780076453_4—First Office Action_ Our Ref_ P19J42412A.msg.
External] O/R: 060011-00538 ∥ IPRP Issued [IWOV-NPCHLT1.FID632501]—Jul. 11, 2019 16:31—From: Williams, Stephanie R. Williams, Stephanie, Feb. 6, 2018 Office action (3 months) 1 US App. No. 20180169771A1.
External Chinese Patent Application No. 201810251132.X First Office Action;Our Ref P17J31437.msg.
Feb. 24, 2021 Notice of Allowance US App. No. 2020/0180047A1.
Feb. 5, 2021—Advisory Action.
Dec. 30, 2020—Final Rejection.
Nov. 25, 2020—Notice of Allowance.
Oct. 22, 2020—FInal Rejection.
Jul. 23, 2020—Non Final Rejection.
Apr. 29, 2020—Non Final Rejection.
Feb. 3, 2020 Exam Notice—_External_ Re_ Y_R_P.msg.
Nov. 15, 2019 Exam Notice—_External_ Re_ Y_R_P.msg.
Aug. 8, 2019 Final OA—dated Aug. 8, 2019—Final Rej.pdf.
Feb. 14, 2019 Non-Final OA—dated Feb. 14, 2019—Non Final.pdf.
Nov. 23, 2018 Advisory Action—dated Nov. 23, 2018—Advisory .pdf.
Oct. 3, 2018 Notice of Allowance—dated Oct. 3, 2018—Notice of.pdf.
Aug. 31, 2018 Final OA—dated Aug. 31, 2018—Final Rej.pdf.
Jun. 11, 2018 Non-Final OA—dated Jun. 11, 2018—Non Final.pdf.
Jun. 8, 2021 Office action (3 months) (US Only) US App. No. 20180169771A1.
May 26, 2021 Office Action (non-US) CN App. No. 110062676A.
Apr. 26, 2021 Office Action (non-US) DE App. No. 102019116160A1.
Apr. 14, 2021 Notice of Allowance US App. No. 2020/0180047A1.
Jan. 15, 2021 English translation of Office Action (non-US) CN App. No. 110062676A.
Jan. 15, 2021 Office Action (non-US) CN App. No. 110062676A.
Jun. 3, 2020 English translation of First OA for CN App No. 201780076453.4.
Jun. 3, 2020 Office Action (non-US) CN App. No. 110062676A.
Jul. 29, 2020 English translation of First OA for CN App. No. 201810251132X.
Jun. 29, 2020 Office Action (non-US) CN App. No. 108687385A.
Nov. 25, 2021 Notice of Allowance—CN App. No. 201780076453.4.
Nov. 8, 2021 Foreign OA—DE App. No. 102021106415.5.
Sep. 27, 2021 Notice of Allowance—U.S. Appl. No. 15/382,120.
Apr. 16, 2018 Search Report International Publication WO App. No. 2018109679A1.

* cited by examiner

CUTTING TOOL HAVING REPLACEABLE CUTTING HEAD AND METHOD OF SECURING A REPLACEABLE CUTTING HEAD

FIELD OF THE DISCLOSURE

In general, the disclosure relates to cutting tools for performing machining operations on a workpiece, and more particularly, to a modular rotary cutting tool having replaceable cutting heads and methods for securing the replaceable cutting head to a tool shank.

BACKGROUND OF THE DISCLOSURE

Conventional cutting tools can be of both one-part and multi-part design. Cutting tools of the type that make use of a holder part or tool body, as well as a separate, replaceable cutting part or insert, are especially common and are known as a modular cutting tool. Such modular cutting tools may be of widely varying shapes and include, for example, drilling tools, milling tools, thread cutters, and the like.

The basic problem of a modular rotary cutting tool, such as a drill, and the like, is to provide support against the cutting forces that try to rotate the cutting head and pull the cutting head out of the tool shank. A lot of solutions are already proposed in the field of modular drills in order to solve this basic problem. Some of them use the principle of rotation to lock the cutting head (i.e., replaceable cutting tip) in the tool shank. A main problem with these solutions is the fact that the cutting head is held in the tool shank only by forces created by deformation of the walls of the tool shank. Therefore, the high cutting forces of the machining operation, such as drilling and the like, or some vibration, can cause the cutting head to unexpectedly loosen from the tool shank. In addition, the life of the cutting head can be reduced due to less clamping force.

A seemingly better solution is to hold the cutting head by a screw. However, one problem with this solution is the screw mechanism is complex, expensive, and a large amount of space is required to assemble the screw, which reduces the stiffness of the cutting head and limits the application of the cutting tool, particularly in small modular drills. In addition, the modular cutting tool may need to be removed from the machine in order to change the cutting head, thereby increasing operational costs.

SUMMARY OF THE DISCLOSURE

The disclosure describes a solution that is more effective in supporting the cutting forces generated during cutting operations to more securely hold the cutting head in the tool shank, while simplifying manufacturing and reducing cost. Another advantage is avoiding the removal of the cutting tool from the machine when replacing the cutting head. Yet another advantage is the reduction of stress in the cutting tool during machining operations, which increases the life of the cutting tool.

In one aspect, a rotary cutting tool comprises a tool shank having a pocket and at least one pair of V-shaped contact surfaces. A cutting head is replaceably mounted in the pocket of the tool shank. The cutting head comprising at least one pair of V-shaped contact surfaces. A coupling pin is at least partially received within a bore of the tool shank. An actuation member engages the coupling pin and causes the cutting head to move relative to the tool shank. The at least one pair of V-shaped contact surfaces of the tool shank engage the at least one pair of V-shaped contact surfaces of the cutting head to distribute cutting forces in two different directions during machining operations.

In another aspect, a rotary cutting tool comprises a tool shank having a pocket and at least one pair of V-shaped contact surfaces formed at a third angle, $A3$, with respect to each other. A cutting head is replaceably mounted in the pocket of the tool shank, the cutting head further comprising at least one pair of V-shaped contact surfaces formed at a fourth angle, $A4$, with respect to each other. A coupling pin is at least partially received within a bore of the tool shank. The coupling pin comprises a threaded portion at one end and a cylindrical portion. The cylindrical portion includes a reduced-diameter portion, the reduced-diameter portion defined by a first angled side wall, a second angled side wall, and a bottom surface therebetween. An actuation member engages the coupling pin and causing the cutting head to move relative to the tool shank, the actuation member having a threaded portion at one end and a non-threaded portion at an opposite end. The non-threaded portion of the actuation member engages one of the pair of angled side walls when the actuation member is rotated in a first direction, and the at least one pair of V-shaped contact surfaces of the tool shank engage the at least one pair of V-shaped contact surfaces of the cutting head when the actuation member is rotated in the first direction.

In yet another aspect, a rotary cutting tool comprises a tool shank having a pocket and at least one pair of V-shaped contact surfaces formed at a third angle, $A3$, with respect to each other. A cutting head is replaceably mounted in the pocket of the tool shank, the cutting head further comprising at least one pair of V-shaped contact surfaces formed at a fourth angle, $A4$, with respect to each other. A coupling pin is at least partially received within a bore of the tool shank. The coupling pin comprises a threaded portion at one end, a reduced-diameter portion at an opposite end, a cylindrical portion disposed between the threaded portion and the reduced-diameter portion, and a notch formed in the cylindrical portion, the notch defined by a first side wall, a second side wall, and a bottom surface therebetween. An actuation member engages the coupling pin and causing the cutting head to move relative to the tool shank, the actuation member having a threaded portion at one end and a frustoconical front portion at an opposite end, the frustoconical front portion having a first angled surface and a second angled surface. The first angled surface of the actuation member engages the first side wall of the notch when the actuation member is rotated in a first direction. The second angled surface of the actuation member engages the second side wall of the notch when the actuation member is rotated in a second direction, the second direction opposite to the first direction. The at least one pair of V-shaped contact surfaces of the tool shank engage the at least one pair of V-shaped contact surfaces of the cutting head when the actuation member is rotated in the first direction. The at least one pair of V-shaped contact surfaces of the tool shank do not engage the at least one pair of V-shaped contact surfaces of the cutting head when the actuation member is rotated in the second direction.

BRIEF DESCRIPTION OF THE DRAWINGS

While various embodiments of the disclosure are illustrated, the particular embodiments shown should not be construed to limit the claims. It is anticipated that various changes and modifications may be made without departing from the scope of this disclosure.

DETAILED DESCRIPTION OF THE DISCLOSURE

Referring now to FIGS. 1-7, a rotary cutting tool 10 is shown according to an embodiment of the disclosure. In general, the rotary cutting tool 10 comprises a modular drill that includes a tool shank 12 and a replaceable cutting head 14, which engages the tool shank 12 when the modular drill 10 is assembled. Although the cutting tool 10 comprises a modular drill in the illustrated embodiment, it should be appreciated that the principles of the disclosure can be applied to any rotary cutting tool with a replaceable cutting tip for metal cutting operations, such as a milling tool or another type of rotating tool, for example a reamer, a tap, and the like. In addition, the description herein of specific applications should not be a limitation on the scope and extent of the use of the rotary cutting tool.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this disclosure pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "elongate" or "elongated" is defined as something that is longer than it is wide. In other words, the width is smaller than its length.

As used herein, the term "circular" is defined as an object having a shape of a circle, i.e., an object having a simple closed shape. It is the set of points in a plane that are at a given distance from a given point, the center; equivalently it is the curve traced out by a point that moves in a plane so that its distance from a given point is constant. The distance between any of the points and the center is called the radius.

As used herein, a "pair of angled surfaces" is defined as any two surfaces that are not parallel to each other, i.e., form a positive relative angle.

As used herein, a "screw" is defined as a threaded fastener having a tapered or non-tapered shank with a helical thread and is driven by rotating the shank with a tool.

Figure 1:
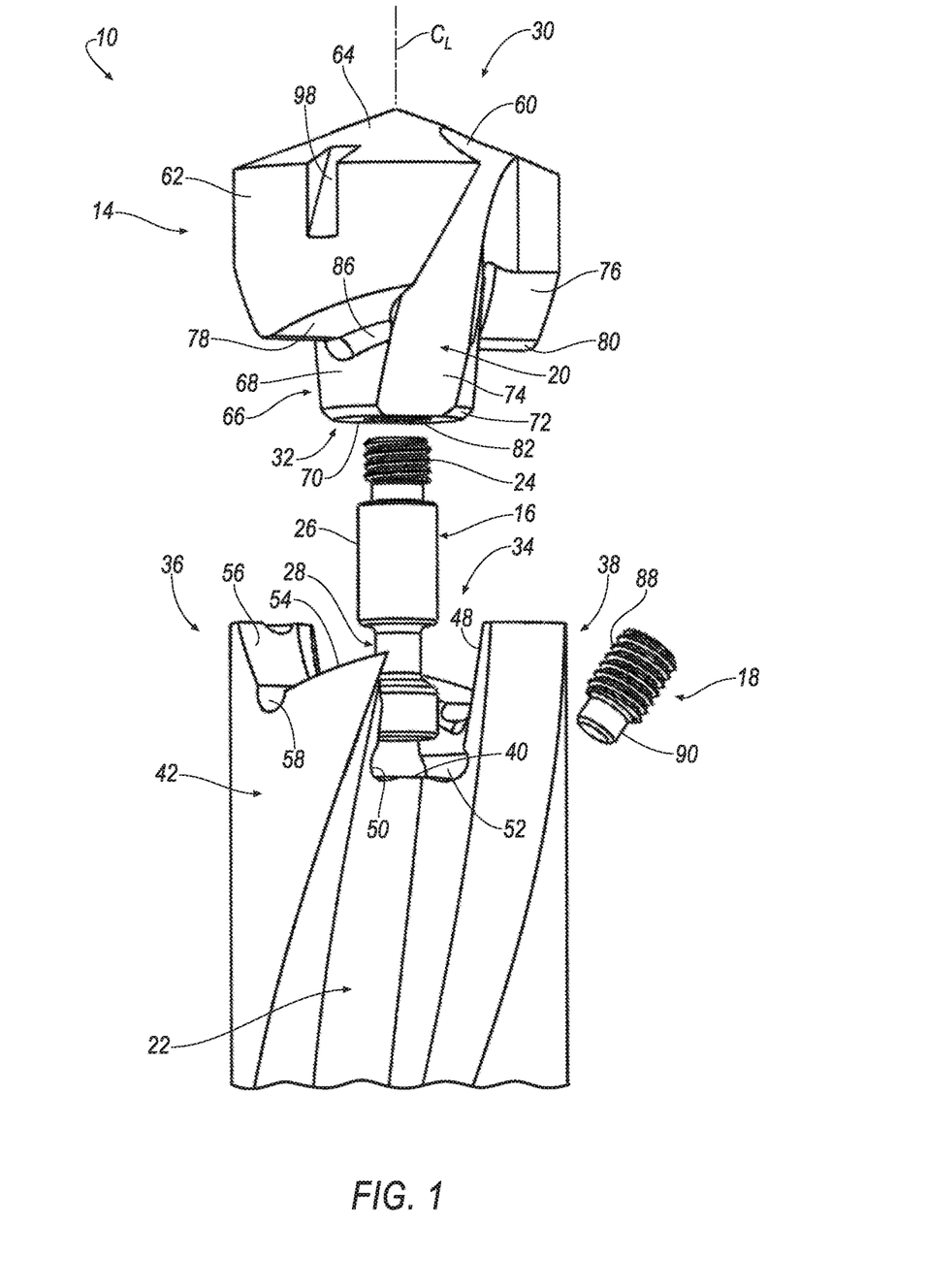
FIG. 1 is a side exploded view of a rotary cutting tool, such as a modular drill, according to an embodiment of the disclosure.
Figure 2:
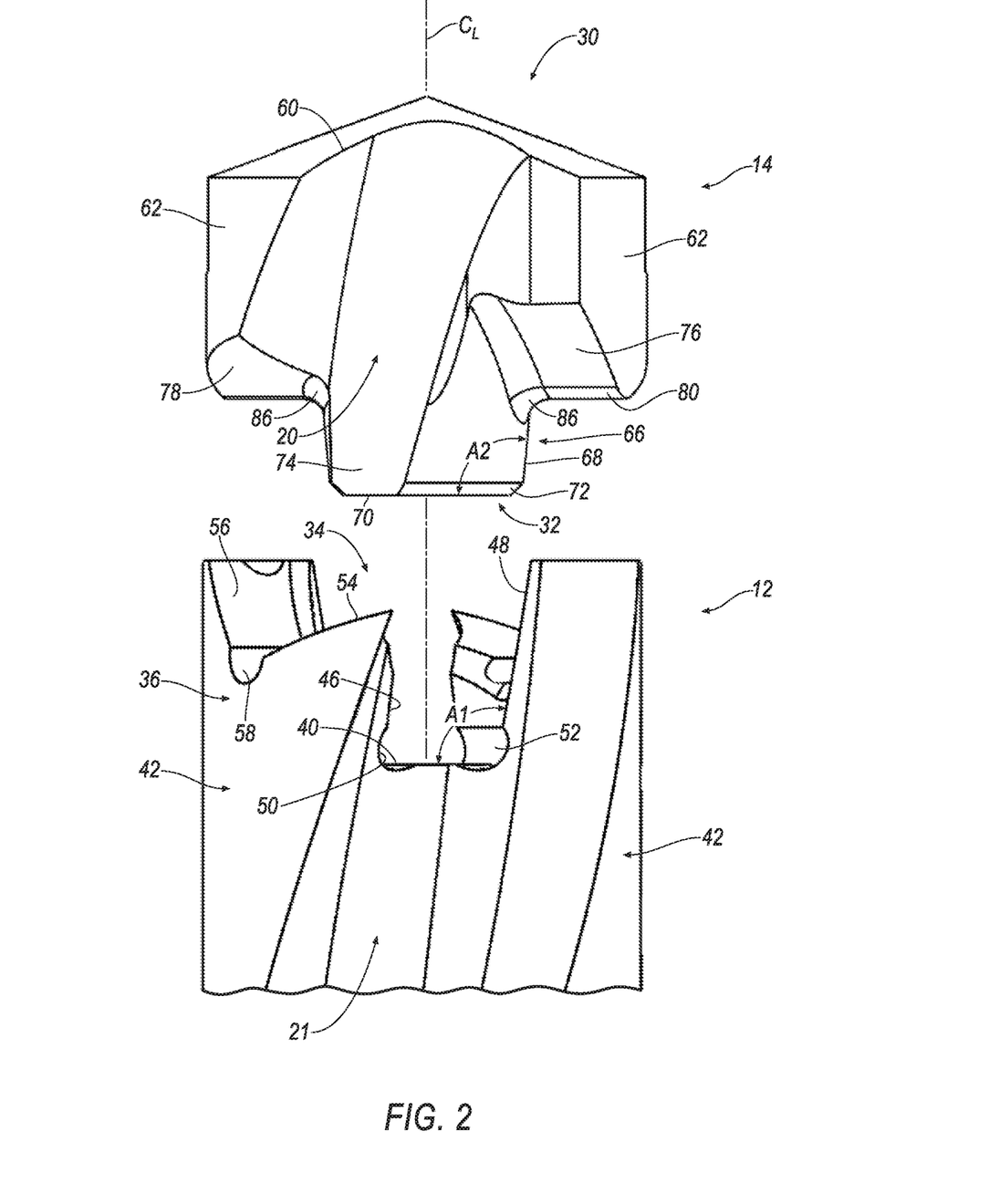
FIG. 2 is an enlarged side view of the tool shank and cutting head of FIG. 1.

Referring now to FIGS. 1 and 2, the modular drill 10 has four basic components:
1) a tool shank 12;
2) a cutting head 14;
3) a coupling pin 16; and
4) an actuation member 18.

It should be noted that the coupling pin 16 can be integrally formed with the cutting head 14, and therefore the modular drill 10 can comprise only three basic components.

Referring now to FIGS. 1-7, two flutes are provided in diametric opposition to one another, only one flute being visible in some drawings. The visible flute has a lateral recess forming part of a flute or cutting head flute portion 20 formed in cutting head 14. A corresponding or complementing lateral recess or shank flute portion 22 is formed in the shank 12.

In the depiction of FIGS. 1-4, the cutting head flute portion 20 emerges at a leading end 30 of the cutting tool 10. The leading end 30 is defined for semantic purposes and is that end that engages a work piece (not shown) during a cutting operation. During cutting operations, the cutting tool 10 is mounted in the rotary cutting tool, rotated, and advanced progressively into the work piece (not shown) as cutting progresses. That end of the cutting head 14 opposite the leading end 30 is termed the trailing end 32. The terms "leading end" and "trailing end" are semantic devices that apply equally to the shank 12 and the cutting head 14 as they connote directional orientation with respect to a central, longitudinal axis, $C_L$, rather than specific structure. The leading end 30 is that which penetrates a work piece (not shown), and the trailing end 32 is that end opposed to the leading end 30.

The portion of the shank 12 that couples to and rotates the cutting head 14 is referred to as a pocket 34. The principal elements of the pocket 34 include two generally symmetrical and similar castellated wall sections 36, 38. The wall section 36 will be described, it being understood that wall section 38 is a generally symmetrical counterpart thereof. Each wall section 36, 38 is essentially a continuation of the body of shank 12 that projects upwardly from a central floor portion 40 of the shank 12 along the outer periphery of shank 12. Each wall section 36, 38 has a smooth outer surface 42 that conforms to and is generally coextensive with the generally cylindrical outer surface of the cutting tool 10. A bore 44 extends downward from the central floor portion 40 of the tool shank 12 for accommodating a portion of the coupling pin 16.

Each wall section 36, 38 has a planar, vertically angled retention surface 46, 48, and an undercut 50, 52, respectively, between the vertically angled retention surfaces 46, 48 and the central floor portion 40. The term "vertically angled" is defined as being formed at a non-zero angle, A1, (i.e. non-parallel) with respect to the central, longitudinal axis, $C_L$, of the cutting tool 10. In other words, the angle, A1, of the vertically angled retention surfaces 46, 48 is not equal to 90 degrees (i.e. non-perpendicular) with respect to the central floor portion 40 of the tool shank 12. The angle, A1, of the retention surfaces 46, 48 can be between about 92 degrees and about 95 degrees with respect to the central floor portion 40 of the tool shank 12, as shown in FIG. 2. The undercuts 50, 52 located between the central floor portion 40 and the retention surfaces 46, 48 provide a smooth transition between the central floor portion 40 and the retention surfaces 46, 48, thereby reducing stresses caused by the interference fit between the tool shank 12 and the cutting head 12, and a reduction of forces exerted on the cutting tool 10 during machining operations. In the illustrated embodiment, the undercuts 50, 52 have an arcuate profile. However, it will be appreciated that the undercuts 50, 52 can have any desirable profile to reduce stresses and forces to provide a break or relief between the central floor portion 40 and the retention surfaces 46, 48.

In one aspect, each wall section 36, 38 has a pair of V-shaped contact surfaces 54, 56 separated by an undercut 58. One pair of V-shaped contact surfaces 54, 56 is located oppositely (i.e., 180 degrees) of the other pair of V-shaped contact surfaces 54, 56. Each pair of V-shaped contact surfaces 54, 56 and complementary in shape with V-shaped contact surfaces of the cutting head 14 as described in more detail below. Although two pairs of V-shaped contact surfaces are shown in the illustrated embodiment, it will be appreciated that the disclosure can be practiced with any desirable number of V-shaped contact surfaces 54, 56.

Figure 3:
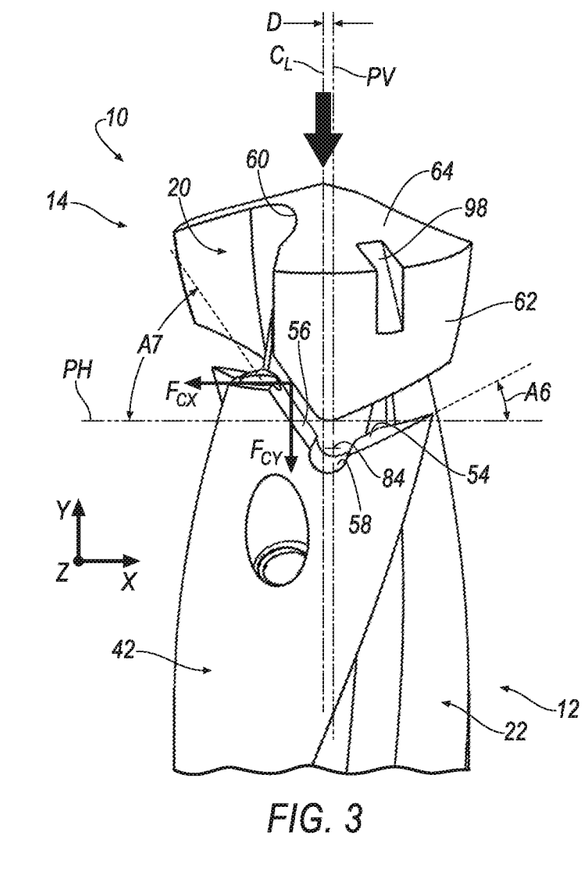
FIG. 3 is a side perspective view of the tool shank and the cutting head when the V-shaped contact surfaces are aligned with each other according to an aspect of the disclosure.
Figure 7:
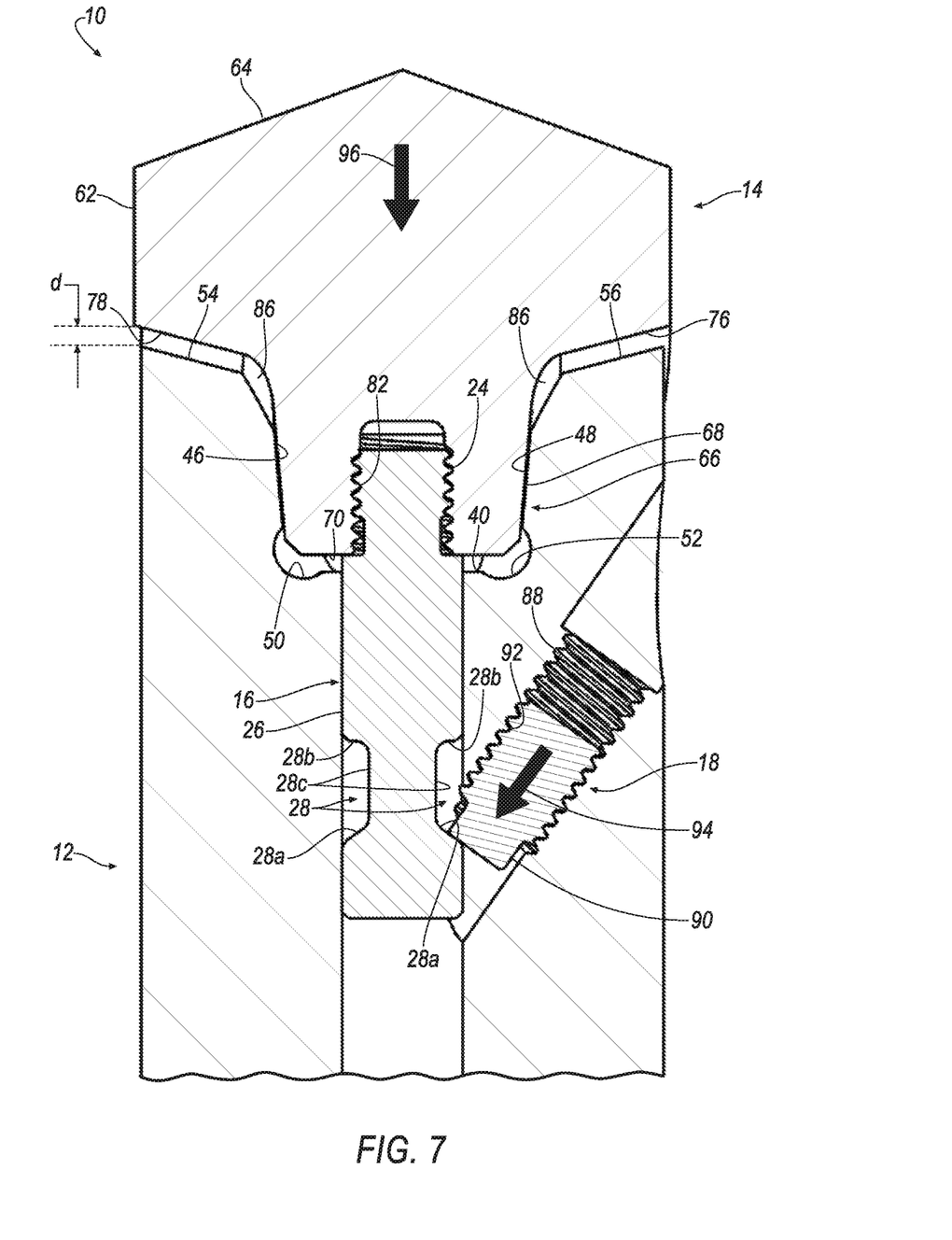
FIG. 7 is a cross-sectional view of the cutting tool of FIG. 1 taken along the central, longitudinal axis, $C_L$, in a non-actuated position showing the actuation member starting to engage the coupling pin to move the cutting head relative to the tool shank according to an embodiment of the disclosure.

As shown in FIGS. 3 and 7, the pair of V-shaped contact surfaces 54, 56 intersect at an axis 84 that lies on a vertical plane, PV, that is parallel to the central, longitudinal axis, $C_L$, in the axial direction. However, the vertical plane, PV, is offset from the central, longitudinal axis, $C_L$, by a distance, D, to optimize the axial support and the transmission of torque generated during cutting operations. Further, the axis 84 is not perpendicular to the central, longitudinal axis, $C_L$, in the radial direction, which improves the centering of the cutting head 14 with respect to the tool shank 12 when mounting the cutting head 14 on the tool shank 12.

Figure 6:
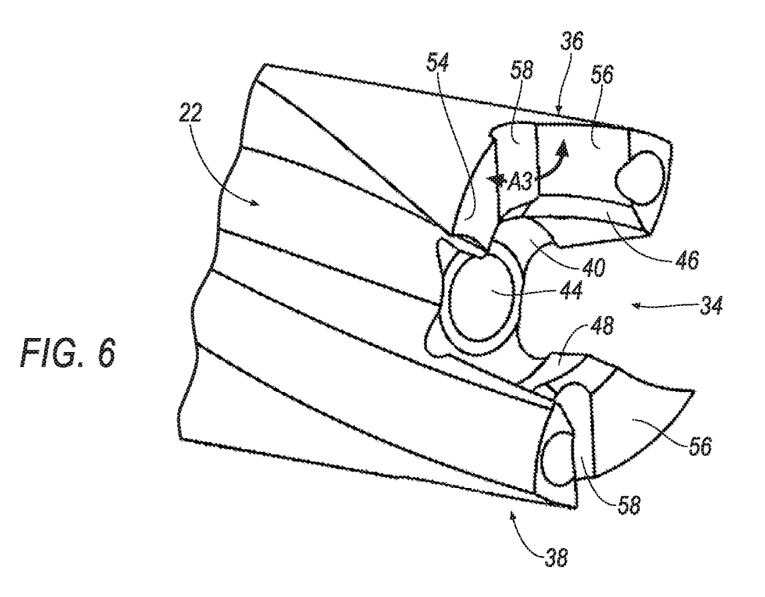
FIG. 6 is a front perspective view of the tool shank according to an embodiment of the disclosure.

The V-shaped contact surfaces 54, 56 are formed at an angle, A3, in a range between about 50 degrees and about 130 degrees, as shown in FIG. 6. As shown in FIG. 3, the contact surface 54 is positioned at an upward angle, A6, with respect to a horizontal plane, PH, in a range between about 45 degrees and about 85 degrees. In other words, the contact surface 54 is angled upwardly toward the leading conical surface 64 of the cutting head 14. By contrast, the contact surface 56 is positioned at an upward angle, A7, with respect to the horizontal plane, PH, in a range between about 95 degrees to about 135 degrees. It should be noted that the horizontal plane, PH, is substantially perpendicular to the vertical plane, PV. The undercut 58 provides a continuous and smooth transition between the contact surfaces 54, 56, which allows for reducing stresses caused during machining operations. In addition, the undercut 58 provides clearance for the cutting head 14 when mounted on the tool shank 12. In the illustrated embodiment, the undercut 58 has an arcuate profile. However, it will be appreciated that the undercut 58 can have any desirable profile to provide a smooth transition between the contact surfaces 54, 56.

The cutting head 14 has at least two main cutting edges 60 (only one main cutting edge is visible in FIG. 1), a peripheral generally cylindrical outer surface 62, and a leading conical surface 64, which is interrupted or incomplete due to presence of the flutes 20.

The cutting head 14 has a shank connection portion opposite the cutting portion, or alternatively stated, facing the trailing end 32 of the cutting head 14, in the form of an interlocking member arranged to retain the cutting head 14 within the pocket 34 of the shank 12. In the embodiment of FIGS. 1-7, this interlocking member comprises a generally frustoconical-shaped member 66, which is located centrally along the central, longitudinal axis, $C_L$.

The frustoconical-shaped member 66 provides an interlocking member corresponding to and engaging the pocket 34, which the pocket 34 serves as an interlocking member of the shank 12. The frustoconical-shaped member 66 is so-called due to its characteristic frustoconical-shaped surfaces 68 formed at an angle, A2, with respect to a bottom surface 70 of the cutting head 14. The angle, A2, of the frustoconical shaped surfaces 68 can be between about 92 degrees and about 95 degrees with respect to the central floor portion 40 of the tool shank 12, as shown in FIG. 2. The angle, A2, may be different than the angle, A1, between the central floor portion 40 and the retention surfaces 46, 48, as shown in FIG. 2. For example, the angle, A1, can be about 92 degrees and the angle, A2, can be about 93 degrees.

The difference in sizes between the two frustoconical-shaped members 66, 68 causes an interference fit and accurately centers the cutting head 14 with respect to the central, longitudinal axis, $C_L$, when assembling the cutting head 14 into the shank 12. As a result, the V-shaped contact surfaces 54, 56 and complementary in shape with the V-shaped contact surfaces 76, 78 of the cutting head 14 are separated by a distance "d" (measured in the axial direction) when the conical surfaces 46 and 48 are making initial contact before final clamping is achieved. Once the distance "d" is closed, the frustoconical-shaped members 66, 68 will form an interference fit.

The frustoconical member 66 includes a chamfer 72 extending between the frustoconical surface 68 and the bottom surface 70 of the cylindrical member 66. The chamfer 72 provides clearance for the cutting head 14 when mounted onto the shank 12. The frustoconical member 66 also includes a lateral recess 74 that modifies the frustoconical surface 68 and forms a portion of the cutting head flute portion 20.

Figure 4:
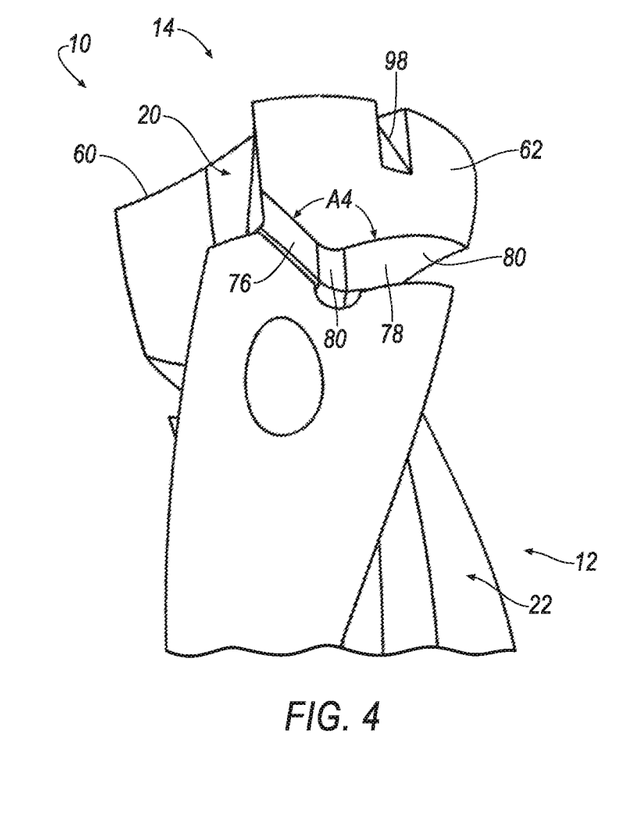
FIG. 4 is another side perspective view of the tool shank and the cutting head when the V-shaped contact surfaces are aligned with each other according to an aspect of the disclosure.

In another aspect, the cutting head 14 has two pairs of V-shaped contact surfaces 76, 78 separated by a radiused surface 80 (only one pair is visible in FIG. 4). One pair of V-shaped contact surfaces 76, 78 is located oppositely (i.e., 180 degrees) of the other pair of V-shaped contact surfaces 76, 78. The V-shaped contact surfaces 76, 78 of the cutting head 14 are complementary in shape and cooperate with the V-shaped contact surfaces 54, 56 of the tool shank 12. Although two pairs of V-shaped contact surfaces are shown in the illustrated embodiment, it will be appreciated that the disclosure can be practiced with a single pair of V-shaped contact surfaces 76, 78.

Similar to the V-shaped contact surfaces 54, 56 of the shank 12, the V-shaped contact surfaces 76, 78 of the cutting head 14 are formed at an angle, A4, in a range between about 50 degrees and about 130 degrees with respect to each other. The radius surface 80 provides a continuous and smooth transition between the contact surfaces 76, 78, which allows for reducing stresses caused during machining operations. In addition, the radiused surface 80 cooperates with the undercut 58 of the tool shank 12.

One benefit and advantage of the cutting tool 10 of the disclosure is that the V-shaped contact surfaces 54, 56 of the tool shank 12 contact with the V-shaped contact surfaces 76, 78 of the cutting head 14 when the cutting head 14 is installed on the tool shank 12. During machining operations, the cutting forces are generated in both the x- and y-directions, as shown in FIG. 3. The contact between the V-shaped contact surfaces 54, 56, 76, 78 provides greater stability against the cutting forces generated during machining operations as compared to conventional cutting tools. This is because the V-shape of the contact surfaces 54, 56, 76, 78 of the cutting tool 10 support the momentum created by the cutting forces in both x- and y-directions, as compared to only in one direction in conventional cutting tools. When the cutting head is driven towards the workpiece, the contact forces between surface 78 and 54 will cause surface 76 of the cutting head to maintain engagement with surface 56 of the tool shank, preventing relative motion between cutting head and tool shank. This is particularly important when the drill is first engaging with the workpiece and torque is low (only tip of the cutting insert is cutting).

Figure 5:
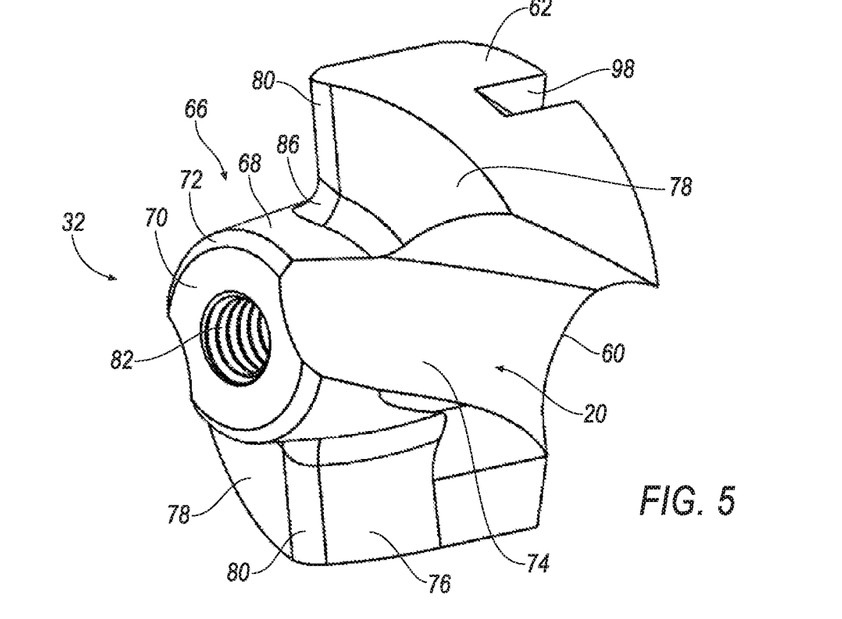
FIG. 5 is a rear perspective view of the cutting head according to an embodiment of the disclosure.

A threaded bore 82 is formed in the bottom surface 70 of the cutting head 14, as shown in FIG. 5. Thus, the cutting head 14 and the coupling pin 16 are screwed together when assembling the cutting tool 10. Both the cutting head 14 and the coupling pin 16 can be supplied assembled together as the manufacturing cost of the coupling pin 16 is very low when compared to the cutting head 14.

As shown in FIGS. 1, 2, 5 and 7, a chamfered surface 86 may be formed between the frustoconical-shaped surface 68 and the downwardly facing V-shaped contact surfaces 76, 78 to provide a smooth transition therebetween and to provide resistance to cracks.

As shown in FIG. 1, the actuation member 18 comprises a threaded member, such as a screw, bolt, and the like, and has a threaded portion 88 at one end and a non-threaded portion 90 at an opposite end. In addition, the coupling pin 16 has a threaded portion 24 at one end, a cylindrical portion 26 having an outer diameter slightly less than the diameter of the bore 44 in the tool shank 12 such that the cylindrical portion 26 can be at least partially disposed therein. The cylindrical portion 26 has a notch portion 28 having a pair of angled side walls 28a, 28b and a bottom surface or base surface 28c therebetween.

The threaded portion 24 is capable of being received in the threaded bore 82 of the cutting head 14, as shown in FIGS. 1 and 7. Once the coupling pin 16 is properly threaded into the cutting head 14, the cutting head 14 can be assembled to the tool shank 12. To assemble the cutting head 14 to the tool shank 12, the operator may hold cutting head 14 with one hand and downwardly move the cutting head 14 towards the tool shank 12 in the direction of the arrow in FIG. 3. During the movement, the V-shaped contact surfaces 76, 78 of the cutting head 14 align the cutting head 14 with the corresponding V-shaped contact surfaces 54, 56 of the tool shank 12, as shown in FIGS. 3 and 4.

Once the V-shaped contact surfaces 54, 56, 76, 78 are aligned with each other, the operator threads the actuation member 18 into a threaded bore 92 in the tool shank 12. Rotating the actuation member 18 in a first direction, such as clockwise, causes the actuation member 18 to move in the direction of the arrow 94, as shown in FIG. 7. Of course, rotating the actuation member 18 in a second, opposite direction, such as counterclockwise, causes the actuation member 18 to move in an opposite direction as the direction of the arrow 94.

As the actuation member 18 moves in the direction of the arrow 94, the non-threaded portion 90 of the actuation member 18 eventually engages one of the angled side walls 28a, 28b of the coupling pin 16, which causes the cutting head 14 to move downwardly relative to the tool shank 12 in the direction of the arrow 96, thereby decreasing the distance "d" between the bottom surface 70 of the cutting head 14 and the central floor portion 40 of the tool shank 12. The actuation member 18 is threaded into the tool shank 12 until any or all of the bottom surface 70 and any or all of the central floor portion 40 abut each other. At the same time, any or all of the V-shaped contact surfaces 54, 56, 76, 78 abut each other. At this point, the cutting tool 10 has been placed in an actuated position and thereby is properly and securely mounted on the tool shank 12, ready for operation.

Removal of the cutting head 14 from the tool shank 12 due to, for example, wear, and the like, can be accomplished in the following manner. First, the actuation member 18 is rotated in a second direction (opposite to arrow 94) to move the cutting head 14 relative to the tool shank 12 to place the cutting tool 10 in a non-actuated position. Then, the cutting head 14 is rotated counterclockwise using a wrench (not shown) that engages a pair of tool recesses or notches 98 on opposite sides of the cutting head 14, as shown in FIGS. 1, 3, 4 and 5. As a result, the cutting head 14 and coupling pin 16 together end up translating away from the tool shank 12. However, each occurrence of rotating the cutting head 14 causes wear on the tool shank 12. In addition, depending of the interference fit between the tool shank 12 and the cutting head 14, excessive torque may be required to rotate the cutting head 12, which causes some difficulties to the operator.

In addition to providing high stability against the cutting forces during machining operations, the V-shaped contact surfaces 54, 56, 76, 78 also act as a ramp to increase the mechanical advantage and help to push the cutting head 14 during its removal out of the tool shank 12 with less rotation of the cutting head 14, as compared to conventional cutting tools. For example, rotating the cutting head 14 only about 60 degrees may be necessary to remove the cutting head 14 from the tool shank 12.

It will be appreciated that the disclosure is not limited by the design of the coupling pin 16 and the actuation member 18, and that the disclosure can be practiced with any design, so long as the coupling pin 16 cooperates with the actuation member 18 to effect the downward movement of the cutting head 14 relative to the tool shank 12. For example, an alternate embodiment of the cutting tool 10 of FIGS. 1-7 is shown in FIGS. 8-10.

Figure 8:
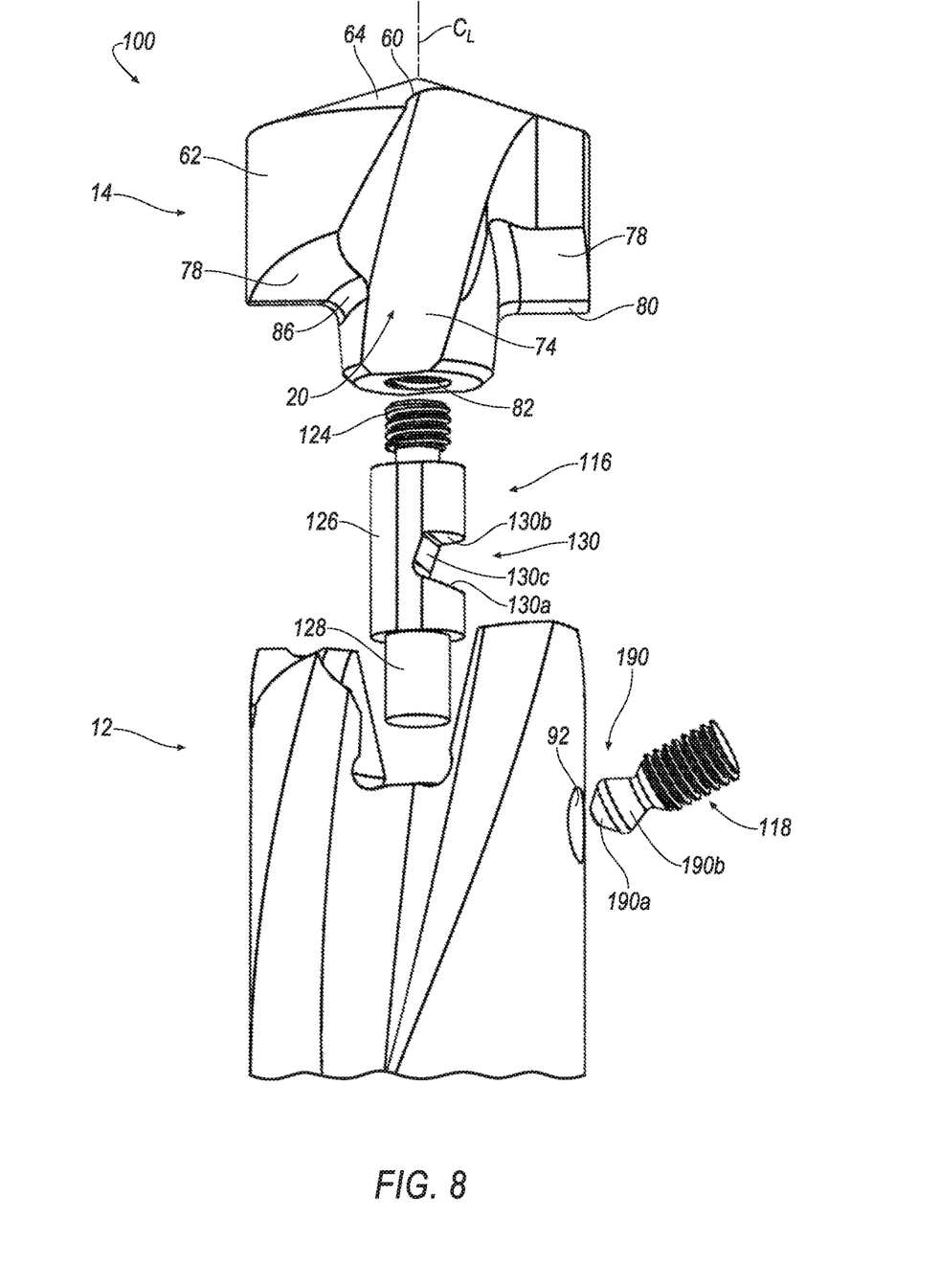
FIG. 8 is a side exploded view of a rotary cutting tool, such as a modular drill, according to another embodiment of the disclosure with a different coupling pin and actuation member as compared to the rotary cutting tool of FIG. 1.
Figure 9:
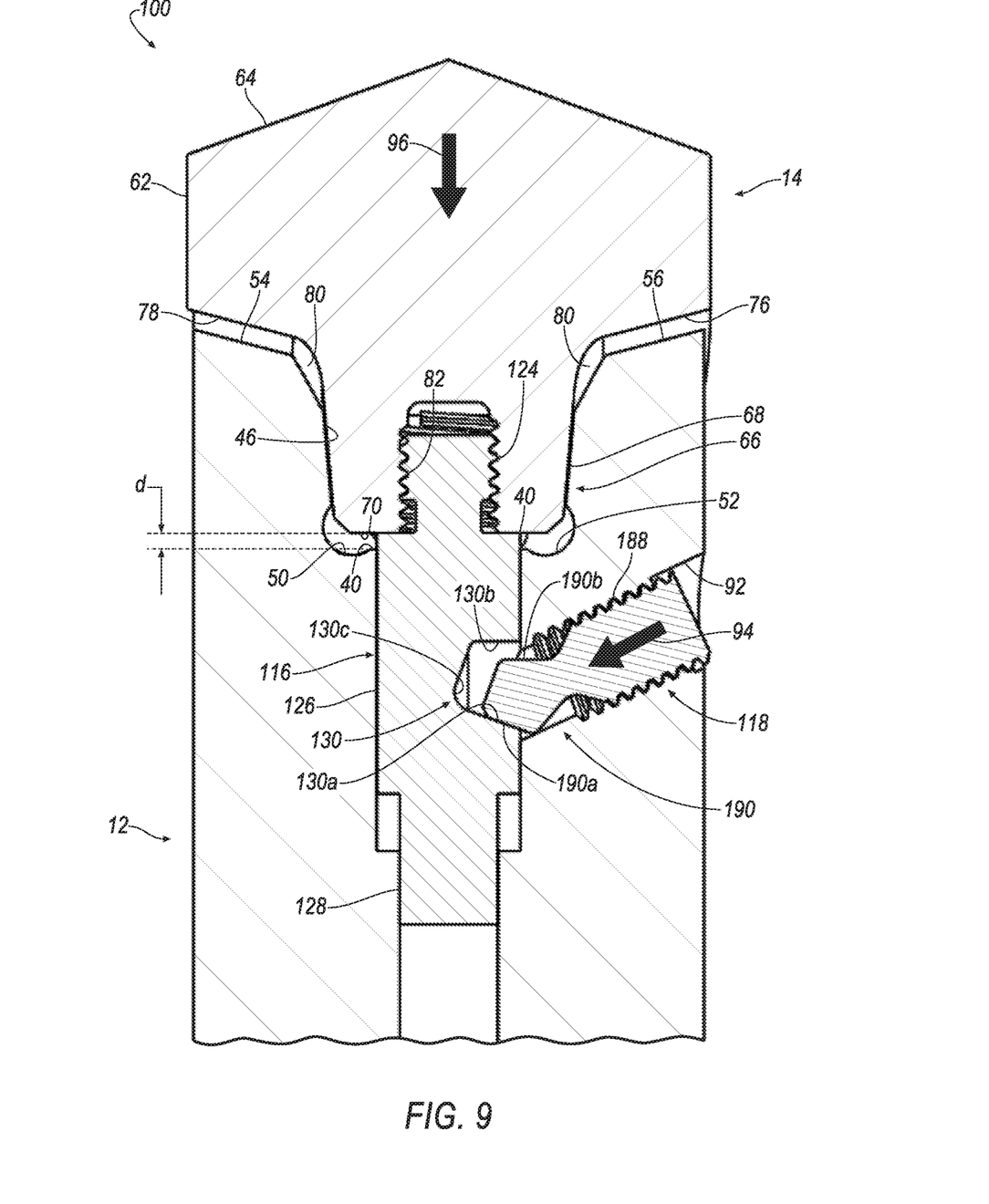
FIG. 9 is a cross-sectional view of the cutting tool of FIG. 8 taken along the central, longitudinal axis, $C_L$, showing the actuation member engaging the coupling pin to move the cutting head relative to the tool shank according to an embodiment of the disclosure.
Figure 10:
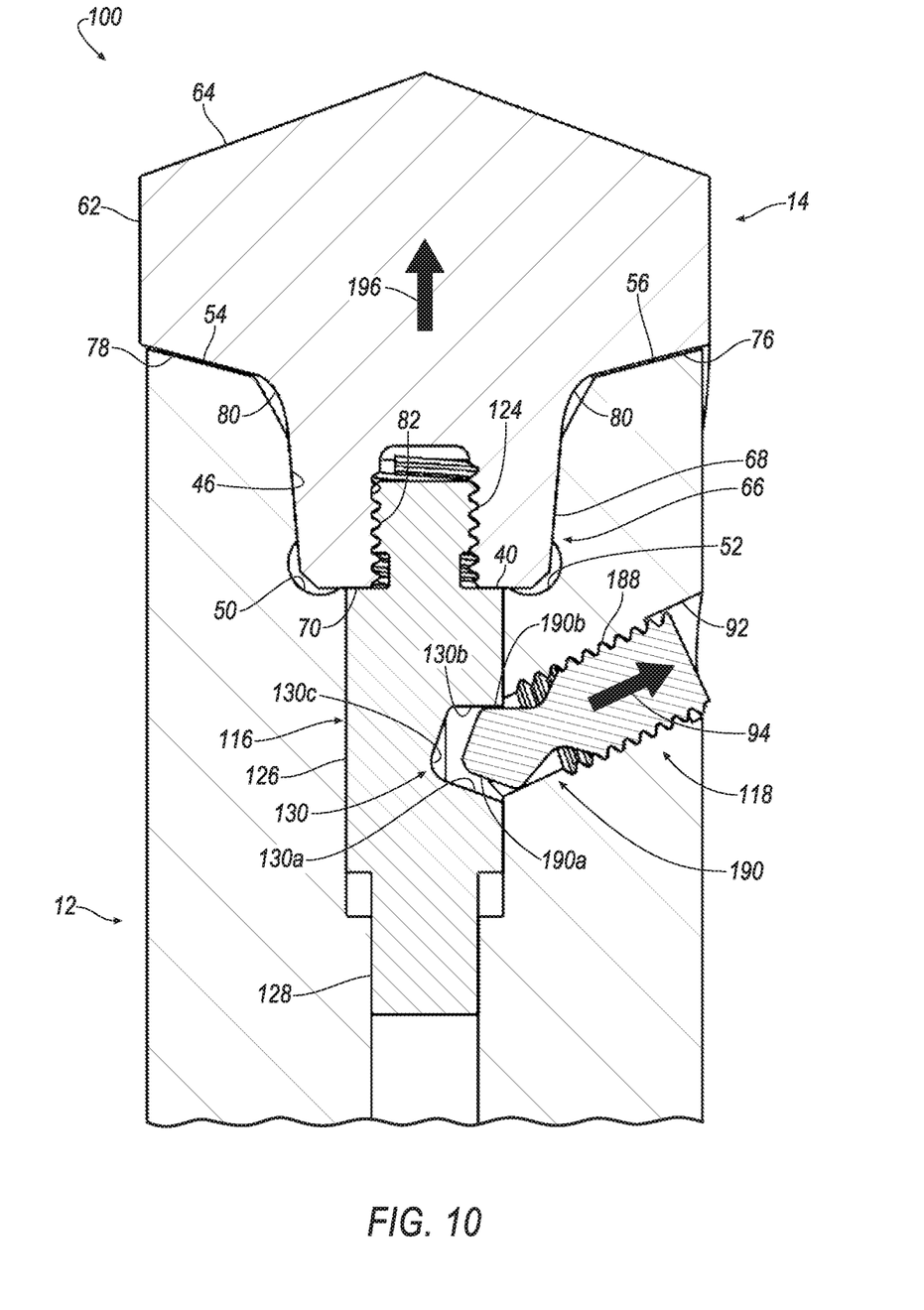
FIG. 10 is a cross-sectional view of the cutting tool of FIG. 8 taken along the central, longitudinal axis, $C_L$, showing the actuation member engaging the coupling pin to move the cutting head relative to the tool shank in an opposite direction according to an embodiment of the disclosure.

Referring now to FIGS. 8-10, a cutting tool 100, such as a modular drill, is shown according to a second embodiment of disclosure. Similar to the first embodiment, the second embodiment comprises four basic components:

1) a tool shank 12;
2) a cutting head 14;
3) a coupling pin 116; and
4) an actuation member 118.

The second embodiment is substantially identical to the first embodiment, except the pin 116 and the actuation member 118 in the second embodiment are different than the pin 16 and the actuation member 18 in the first embodiment.

Similar to the pin 16, the pin 116 has a threaded portion 124 at one end, a cylindrical portion 126 and a reduced diameter portion 128. However, the notch portion 28 of the first embodiment has angled side walls 28a, 28b, which are absent in the second embodiment. Rather, the cylindrical portion 126 and the reduced diameter portion 128 of the pin 116 of the second embodiment are generally elongated in order to increase stiffness to support the clamping force. In addition, the reduced diameter portion 128 helps align the cutting head 14 and the tool shank 12 along the central, longitudinal axis, $C_L$, of the cutting tool 100.

The cylindrical portion 126 of the pin 116 includes a notch 130 defined by a pair of side walls 130a, 130b and a bottom surface or base surface 130c therebetween. The side walls 130a, 130b can be parallel or non-parallel to each other. In addition, the side walls 130a, 130b can be perpendicular or non-perpendicular to the bottom surface 130c. In the illustrated embodiment, the side walls 130a, 130b are non-parallel to each other, i.e., the side walls 130a, 130b form a non-zero angle with respect to each other. In addition, the side walls 130a, 130b are non-perpendicular to the bottom surface 130c, i.e., the side walls 130a, 130b form an angle not equal to 90 degrees with respect to the bottom surface 130c. In the illustrated embodiment, each of the side walls 130a, 130b forms an angle of greater than 90 degrees with respect to the bottom surface 130c. Thus, the side walls 130a, 130b diverge from one another in progressing away from the bottom surface 130c.

Similar to the actuation member 18, the actuation member 118 has a threaded portion 188 at one end. Unlike the actuation member 18 with the non-threaded portion 90 at the opposite end, the actuation member 118 has a bulbous front portion 190 defined by a pair of frustoconical surfaces 190a, 190b. Specifically, the frustoconical surfaces 190a, 190b are disposed adjacent to one another and, in an embodiment, separated (as shown) by a thin cylindrical strip with a diameter equivalent to a maximum diameter of each of the frustoconical surfaces 190a, 190b. It is noted that the frustoconical surface 190b is disposed closer to the threaded portion 188 than the frustoconical surface 190a.

Similar to the threaded portion 24 of the coupling pin 16, the threaded portion 124 of the coupling pin 116 is capable of being received in the threaded bore 82 of the cutting head 14, as shown in FIGS. 8-10. Once the coupling pin 116 is properly threaded into the cutting head 14, the cutting head 14 can be assembled to the tool shank 12. Similar to the earlier embodiment, once the V-shaped contact surfaces 54, 56, 76, 78 are aligned with each other, the operator threads the actuation member 18 into a threaded bore 92 in the tool shank 12 in the direction of the arrow 94 in FIG. 9.

Rotation of the actuation member 118 in a first direction, such as clockwise, causes the actuation member 118 to move relative to the tool shank 12 in the direction of the arrow 94. As the actuation member 118 moves in the direction of the arrow 94, the frustoconical front portion 190 of the actuation member 118 eventually engages one of the side walls 130a, 130b of the coupling pin 116, which causes the cutting head 14 to move downwardly in the direction of the arrow 96. As a result of the downward movement of the cutting head 14 relative to the tool shank 12, the distance, d, decreases between the bottom surface 70 of the cutting head 14 and the central floor portion 40 of the tool shank 12. Specifically, the angled surface 190a of the frustoconical front portion 190 of the actuation member 118 engages the side wall 130a of the coupling pin 116. The actuation member 118 is threaded into the tool shank 12 until any or all of the bottom surface 70 and any or all of the central floor portion 40 abut each other, as shown in FIG. 10. At the same time, any or all of the V-shaped contact surfaces 54, 56, 76, 78 abut each other. At this point, the cutting head 14 has been placed in an actuated position and thereby is securely mounted on the tool shank 12, ready for operation.

Removal of the cutting head 14 from the tool shank 12 due to, for example, wear, and the like, can be accomplished in the following manner. The actuation member 118 is rotated in a second direction opposite to the first direction, such as counterclockwise, such that the actuation member 118 moves in the direction of the arrow 194 in FIG. 10. As the actuation member 118 moves in the direction of the arrow 194, the frustoconical front portion 190 of the actuation member 118 engages the coupling pin 116 to cause the coupling pin 116 to move in an upward direction indicated by the arrow 196. Specifically, the angled surface 190b of the frustoconical front portion 190 of the actuation member 118 engages the side wall 130b of the notch 130 in the coupling pin 116, thereby moving the cutting head 14 in the direction of the arrow 196 relative to the tool shank 12. In this embodiment, a wrench is not needed to rotate the cutting head 14 with respect to the tool shank 12, unlike the earlier embodiment shown in FIGS. 1-7.

In addition to providing high stability against the cutting forces in different directions (i.e., x- and y-directions) during machining operations, the V-shaped contact surfaces 54, 56, 76, 78 also act as a guide to position the cutting head prior to final clamping. Unlike conventional modular cutting tools, rotation of the cutting head 14 is not necessary for clamping. In the embodiment shown in FIGS. 8-10, no rotation of the cutting head 14 is needed to completely remove the cutting head 14 from the tool shank 12.

As described herein above, the cutting tool 10, 100 of the disclosure has the following benefits and advantages:
1) The V-shaped contact surfaces 54, 56, 76, 78 provide high stability against the cutting forces generated during machining operations.
2) The cutting tool 10, 100 is simple to manufacture, thereby lowering manufacturing costs.
3) The V-shaped contact surface 54, 56, 76, 78 act as guiding surfaces during mounting of the cutting head 14 to the tool shank 12.
4) The interference fit between the cutting head 14 and the tool shank 12 helps keep contact between them during machining operations when the tool shank may become deformed due to the cutting forces generated during machining operations.
5) The torque generated during movement of the actuation member 18, 118 can be controlled with a torque wrench.
6) No rotation of the cutting head 14 is necessary for removal of the cutting head 14 due to damage.
7) Finite Element Analysis (FEA) simulations demonstrate that the tool shank 12 and the cutting head 14 exhibit lower stress during machining operations, as compared to conventional cutting tools, thereby extending tool life.

Having described presently preferred embodiments the disclosure may be otherwise embodied within the scope of the appended claims.

What is claimed is:

1. A rotary cutting tool, comprising:
a tool shank having a pocket formed by two castellated wall sections, each wall section having a vertically angled retention surface and at least one pair of V-shaped contact surfaces, each retention surface formed at a first angle, A1, with respect to a central floor portion of the pocket;
a cutting head replaceable mounted in the pocket of the tool shank, the cutting head further comprising at least one pair of V-shaped contact surfaces, the cutting head having a plurality of frustoconical-shaped surfaces, each frustoconical-shaped surface formed at a second angle, A2, different than the first angle, A1, thereby causing the at least one pair of V-shaped contact surfaces of the cutting head and the at least one pair of V-shaped contact surfaces of the tool shank to be separated by a distance, d, when initially assembling the cutting head into the tool shank;
a coupling pin at least partially received within a bore of the tool shank, the coupling pin comprising a threaded portion at one end and a cylindrical portion, the cylindrical portion including a reduced-diameter portion, the reduced-diameter portion defined by a first angled side wall, a second angled side wall, and a bottom surface therebetween; and
an actuation member for engaging the coupling pin and causing the cutting head to move relative to the tool shank, the actuation member having a threaded portion at one end and a non-threaded portion at an opposite end, the non-threaded portion of the actuation member engaging one of the first and second angled side walls when the actuation member is rotated in a first direction,
wherein the actuation member causes the cutting head to move relative to the tool shank to close the distance, d, such that the at least one pair of V-shaped contact surfaces of the cutting head engage the at least one pair of V-shaped contact surfaces of the tool shank, thereby forming an interference fit between the tool shank and the cutting head and distributing cutting forces in two different directions during a machining operation.

2. The rotary cutting tool according to claim 1, wherein the at least one pair of V-shaped contact surfaces of the tool shank are formed at a third angle, A3, with respect to each other, and wherein the at least one pair of V-shaped contact surfaces of the cutting head are formed at a fourth angle, A4, with respect to each other.

3. The rotary cutting tool according to claim 2, wherein the third angle, A3, is in a range between about 50 degrees and about 130 degrees, and wherein the fourth angle, A4, is in a range between about 50 degrees and about 130 degrees.

4. The rotary cutting tool according to claim 1, wherein one of the at least one pair of V-shaped contact surfaces of the tool shank is formed at an upward angle, A6, with respect to a horizontal plane, PH, and wherein the other one of the at least one pair of V-shaped contact surfaces of the tool shank is formed at an upward angle, A7, with respect to the horizontal plane, PH, the angle, A7, being different than the angle, A6.

5. The rotary cutting tool according to claim 4, wherein the angle, A6, is in a range between about 45 degrees and about 85 degrees, and wherein the angle, A7 is in a range between about 95 degrees to about 135 degrees.

6. The rotary cutting tool according to claim 1, wherein the first angle, A1, is between about 92 degrees and about 93 degrees, and wherein the second angle, A2, is between about 92 degrees and about 93 degrees.

7. The rotary cutting tool according to claim 1, further comprising an undercut between each retention surface and the central floor portion.

8. A rotary cutting tool, comprising:
a tool shank having a pocket formed by two castellated wall sections, each wall section having a vertically angled retention surface and at least one pair of V-shaped contact surfaces formed at a third angle, A3, with respect to each other, each retention surface formed at a first angle, A1, with respect to a central floor portion of the pocket;
a cutting head replaceably mounted in the pocket of the tool shank, the cutting head further comprising at least one pair of V-shaped contact surfaces formed at a fourth angle, A4, with respect to each other, the cutting head has a plurality of frustoconical-shaped surfaces, each frustoconical-shaped surface formed at a second angle, A2, different than the first angle, A1, thereby causing the at least one pair of V-shaped contact surfaces of the cutting head and the at least one pair of V-shaped contact surfaces of the tool shank to be separated by a distance, d, when initially assembling the cutting head into the tool shank;
a coupling pin at least partially received within a bore of the tool shank, the coupling pin comprising a threaded portion at one end and a cylindrical portion, the cylindrical portion including a reduced-diameter portion, the reduced-diameter portion defined by a first angled side wall, a second angled side wall, and a bottom surface therebetween; and an actuation member for engaging the coupling pin and causing the cutting head to move relative to the tool shank, the actuation member having a threaded portion at one end and a non-threaded portion at an opposite end, wherein the non-threaded portion of the actuation member engages one of the pair of angled side walls when the actuation member is rotated in a first direction, wherein the actuation member causes the cutting head to move relative to the tool shank to close the distance, d, such that the at least one pair of V-shaped contact surfaces of the tool shank engage the at least one pair of V-shaped contact surfaces of the cutting head when the actuation member is rotated in the first direction, thereby forming an interference fit between the tool shank and the cutting head.

9. The rotary cutting tool according to claim 8, wherein one of the at least one pair of V-shaped contact surfaces of the tool shank is formed at an upward angle, A6, with respect to a horizontal plane, PH, and wherein the other one of the at least one pair of V-shaped contact surfaces of the tool shank is formed at an upward angle, A7, with respect to the horizontal plane, PH, the angle, A7, being different than the angle, A6.

10. The rotary cutting tool according to claim 9, wherein the angle, A6, is in a range between about 45 degrees and about 85 degrees, and wherein the angle, A7 is in a range between about 95 degrees to about 135 degrees.

11. A rotary cutting tool, comprising:
a tool shank having a pocket formed by two castellated wall sections, each wall section having a vertically angled retention surface and at least one pair of V-shaped contact surfaces formed at a third angle, A3, with respect to each other;
a cutting head replaceably mounted in the pocket of the tool shank, the cutting head further comprising at least one pair of V-shaped contact surfaces formed at a fourth angle, A4, with respect to each other;
a coupling pin at least partially received within a bore of the tool shank, the coupling pin comprising a threaded portion at one end, a reduced-diameter portion at an opposite end, a cylindrical portion disposed between the threaded portion and the reduced-diameter portion, and a notch formed in the cylindrical portion, the notch defined by a first side wall, a second side wall, and a bottom surface therebetween; and an actuation member for engaging the coupling pin and causing the cutting head to move relative to the tool shank, the actuation member having a threaded portion at one end and a frustoconical front portion at an opposite end, the frustoconical front portion having a first angled surface and a second angled surface, wherein the first angled surface of the actuation member engages the first side wall of the notch when the actuation member is rotated in a first direction, wherein the second angled surface of the actuation member engages the second side wall of the notch when the actuation member is rotated in a second direction, the second direction opposite to the first direction, wherein the at least one pair of V-shaped contact surfaces of the tool shank engage the at least one pair of V-shaped contact surfaces of the cutting head when the actuation member is rotated in the first direction, and wherein the at least one pair of V-shaped contact surfaces of the tool shank do not engage the at least one pair of V-shaped contact surfaces of the cutting head when the actuation member is rotated in the second direction.

12. The rotary cutting tool according to claim 11, wherein the tool shank has a plurality of retention surfaces, each retention surface formed at a first angle, A1, with respect to a central floor portion of the pocket, and wherein the cutting head has a plurality of frustoconical-shaped surfaces, each frustoconical-shaped surface formed at a second angle, A2, different than the first angle, A1, of each retention surface.

13. The rotary cutting tool according to claim 11, wherein one of the at least one pair of V-shaped contact surfaces of the tool shank is formed at an upward angle, A6, with respect to a horizontal plane, PH, and wherein the other one of the at least one pair of V-shaped contact surfaces of the tool shank is formed at an upward angle, A7, with respect to the horizontal plane, PH, the angle, A7, being different than the angle, A6.

14. The rotary cutting tool according to claim 13, wherein the angle, A6, is in a range between about 45 degrees and about 85 degrees, and wherein the angle, A7 is in a range between about 95 degrees to about 135 degrees.

* * * * *